Patented Sept. 6, 1932

1,876,326

UNITED STATES PATENT OFFICE

RICHARD LANT, OF VIENNA, AUSTRIA

TREATMENT OF PETROL AND OTHER ORGANIC LIQUIDS CONTAINING WATER

No Drawing. Application filed October 26, 1929, Serial No. 402,808, and in Great Britain September 10, 1929.

This invention relates to the treatment of petrol and other organic liquids containing water in suspension and has for its object to provide improvements in the treatment of such liquids for the purpose of effecting the removal of the water.

The invention consists, broadly, in subjecting organic liquids, such as petrol and the like, to treatment with the higher fatty acid esters of cellulose, which are insoluble in the organic liquid treated and are esters of fatty acids containing not more than one double bond and no free hydroxyl group other than that of the carboxyl group which fatty acids contain in their molecules between 12 and 20 carbon atoms.

The fatty acid esters employed in accordance with the invention will generally be the esters of fatty acids, the glycerides of which constitute the main constituents of non-drying oils and fats, and as examples of such fatty acid esters the stearic acid, palmitic acid, lauric acid and oleic acid esters of cellulose which are of a relatively low degree of esterification may be specified.

Generally speaking, it may be stated that the higher fatty acid esters of cellulose or near derivatives of the same and the like carbohydrates which are of a higher degree of esterification are soluble in a variety of organic solvents and consequently, in accordance with the invention, the less highly esterified products obtained by the esterification of carbohydrates such as cellulose or the like will be used.

Higher fatty acid esters of carbohydrates of the general formula $(C_6H_{10}O_5)$ $n$ may conveniently be employed in accordance with the invention as a filtration medium and for use in this manner such esters may be employed in the form of relatively thin layers, sheets, plates or slabs.

Thus, for instance, the esters may be converted into a felt-like structure.

Alternatively, in certain instances it may be convenient to employ the esters in the form of or associated with woven fabrics in which case cellulosic material in the form of a fabric of suitable density may be subjected to the action of esterifying agents in order to convert the cellulose to a greater or less extent into higher fatty acid esters of cellulose insoluble in the organic liquid in the treatment of which the material is to be used.

The invention extends to a filtering medium consisting of a coherent but liquid permeable body of higher fatty acid esters of cellulose or its near derivatives which are esters of fatty acids containing not more than one double bond and no free hydroxyl group other than that of the carboxyl group which fatty acids contain in their molecules between 12 and 20 carbon atoms.

The invention, further, extends to a filter comprising a funnel or a vessel provided with means for introducing the liquid to be filtered and means for withdrawing the filtered liquid therefrom, a filtering body containing higher fatty acid esters of cellulose and means adapted to secure the appropriate positioning or location of the filtering body.

Thus a filter in accordance with the invention, adapted for use in connection with internal combustion engines operated by petrol or the like liquid fuel, may comprise a vessel provided with an inlet for the liquid, a filtering body within the vessel and an outlet for the filtered liquid so located that water will remain in the vessel while the filtered liquid passes to an outlet therefor in an inward direction through the filtering medium. In such a filter the filtering medium may be in the form of a bag or body arranged within a vessel so that the liquid to be filtered will be delivered directly into the vessel while the filtered liquid passes in an inward direction through the walls of the bag or through the filtering body to an outlet adjacent the top of the vessel.

Except, therefore, in respect of the filtering medium such a filtering device may resemble filters of known character using chamois leather or a plurality of closely packed or piled metal plates as the filtering medium and as is usual in such devices the body of the vessel may be removably connected with a member in which the inlet and outlet are provided and which is furnished with means for securing the filtering medium in position.

The following particulars are given by way of example to illustrate a suitable method of producing higher fatty acid esters of cellulose for use in accordance with the invention:—

200 c. cs. of pyridin are dissolved in 100 c. cs. of chlorbenzene. Into this solution with cooling a solution of 300 grams of stearyl chloride in 600 c. cs. of chlorbenzene is allowed to flow slowly and into the mixture thus obtained 100 grams of carefully dried cotton wool is introduced. The mixture is then heated under a reflux condenser in a water bath to substantially 100° C. for twelve to fourteen hours. The reaction product is then filtered on a suction filter and the material on the filter is washed with chloroform until all soluble portions have been removed. The residue consists of insoluble cellulose stearate and it may, in its moist state, be pressed into sheets, threads, pellets, or bodies of other form and dried until all the chloroform is removed when it will be ready for use.

Having now described my invention, what I claim as new and desire to secure by Letters Patent is:—

1. A method of treating petrol and other organic liquids containing water in suspension for the purpose of effecting the removal of the water which comprises filtering the same through a body of a cellulose ester of a fatty acid, the glyceride of which constitutes the main constituent of a non-drying oil or fat.

2. A method of treating petrol and other organic liquids containing water in suspension for the purpose of effecting the removal of the water which comprises filtering the same through a body of a stearic acid ester of cellulose which is insoluble therein.

3. A method of treating petrol and other organic liquids containing water in suspension for the purpose of effecting the removal of the water which comprises filtering the same through cellulose esters of the higher fatty acids which are present as glycerides in non-drying oils or fats.

4. A method of treating petrol and other organic liquids containing water in suspension for the purpose of effecting the removal of the water which comprises filtering the same through a body of an ester of cellulose which is insoluble in the organic liquid, and is an ester of a fatty acid containing not more than one double bond and containing no other free hydroxyl group than that in the carboxyl group which fatty acid contains in its molecule between 12 and 20 carbon atoms.

5. A method of treating petrol and other organic liquids containing water in suspension for the purpose of effecting the removal of the water which comprises filtering the same through a coherent layer of an ester of cellulose, which is insoluble in the organic liquid and is an ester of a fatty acid containing not more than one double bond and no free hydroxyl group other than that of the carboxyl group, which fatty acid contains in its molecule between 12 and 20 carbon atoms.

6. A filtering medium for organic liquids consisting of a coherent but liquid permeable body of an ester of cellulose which is insoluble in the organic liquid and is an ester of a fatty acid containing not more than one double bond and no free hydroxyl group other than that of the carboxyl group, which fatty acid contains in its molecule between 12 and 20 carbon atoms.

7. A filtering medium for petrol, gasolene and the like liquids containing water in suspension consisting of a coherent but liquid permeable body of a stearic acid ester of cellulose insoluble in the liquid.

8. A filter comprising a funnel or a vessel provided with means for introducing the liquid to be filtered and means for withdrawing the filtered liquid therefrom, a filtering body containing a higher fatty acid ester which is insoluble in the liquid and is an ester of a fatty acid containing not more than one double bond and no free hydroxyl group other than that in the carboxyl group, which fatty acid contains in its molecule between 12 and 20 carbon atoms.

9. A filter adapted for use in connection with internal combustion engines operated by petrol or the like liquid fuel, comprising a vessel provided with an inlet for the liquid, a body consisting essentially of a higher fatty acid ester of cellulose insoluble therein and which is an ester of a fatty acid containing not more than one double bond and no free hydroxyl group other than that in the carboxyl group which fatty acid contains in its molecule between 12 and 20 carbon atoms.

In testimony whereof I have signed my name to this specification.

RICHARD LANT.